United States Patent [19]

Araujo et al.

[11] Patent Number: 5,261,704
[45] Date of Patent: Nov. 16, 1993

[54] AIR MANIFOLD

[76] Inventors: Mario Araujo, 161 Pennsylvania Avenue, Unit 4, Concord, Ontario, Canada, L4K 1C3; Ron Elgez, 775 Steeles Avenue W., Apt. 1402, Toronto, Ontario, Canada, M2R 2S8

[21] Appl. No.: 892,934

[22] Filed: Jun. 3, 1992

[51] Int. Cl.⁵ .............................................. F16L 25/00
[52] U.S. Cl. ......................................... 285/9.1; 285/61; 285/150; 285/423; 285/901; 248/206.5
[58] Field of Search ................... 285/9.1, 150, 61, 423, 285/901; 248/206.5, 683

[56] References Cited

U.S. PATENT DOCUMENTS

| | | | |
|---|---|---|---|
| 2,652,069 | 9/1953 | Goheen | 285/150 X |
| 3,917,318 | 11/1975 | Legris | 285/150 |
| 3,934,605 | 1/1976 | Legris | 285/150 X |
| 4,567,546 | 1/1986 | Zeller et al. | 248/206.5 X |
| 4,709,947 | 12/1987 | Kniess | 285/150 |
| 4,957,266 | 9/1990 | Ellis | 248/206.5 X |
| 5,090,740 | 2/1992 | Creager et al. | 285/61 |

Primary Examiner—Dave W. Arola
Attorney, Agent, or Firm—Eugene J. A. Gierczak

[57] ABSTRACT

This invention relates to an air manifold having a plurality of apertures communicating with each other interiorally of the air manifold, wherein one of the apertures is adapted to communicate with a compressed air source, and the other apertures are adapted to selectively receive either closing means for maintaining the compressed air source interiorally of the manifold or compressed air conduits for communication with the compressed air source.

8 Claims, 3 Drawing Sheets

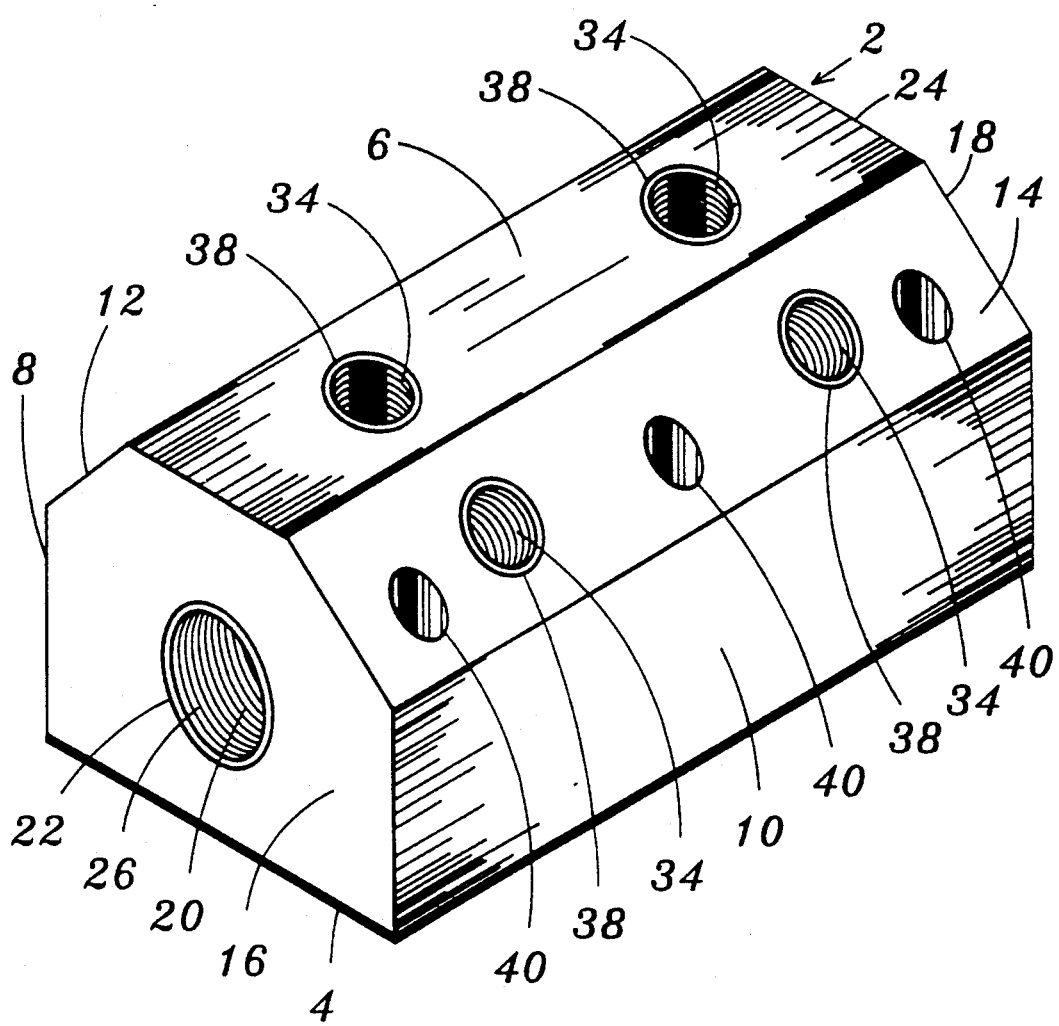
Figure #1

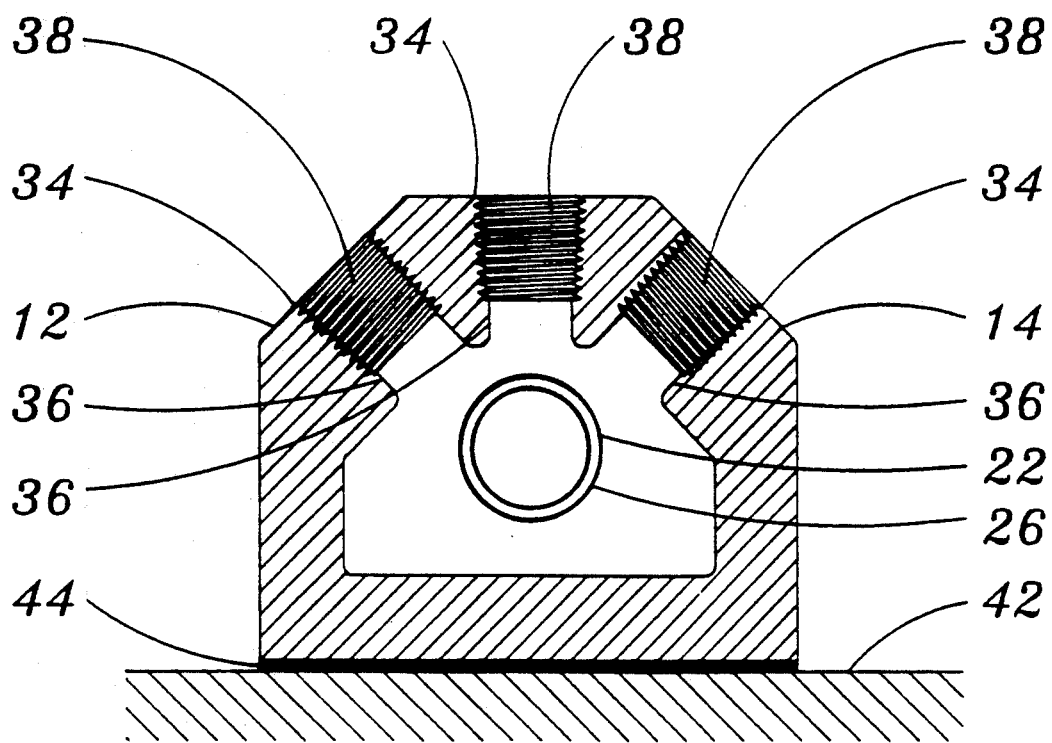
FIGURE #2

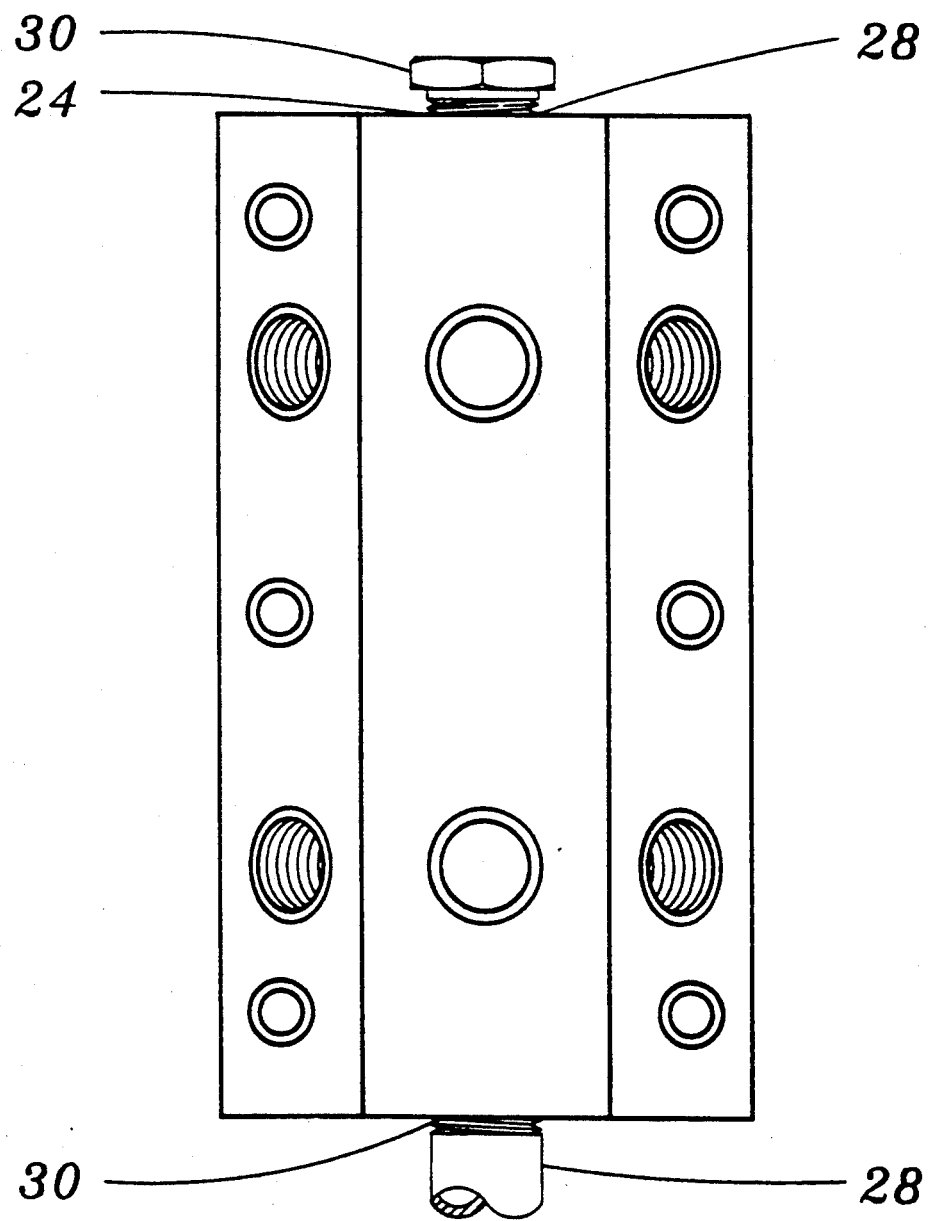
FIGURE # 3

AIR MANIFOLD

FIELD OF INVENTION

This invention relates to an air manifold having a plurality of apertures and particularly relates to a compressed air junction box which communicates with a compressed air source and includes a plurality of apertures which may be selectively closed or opened to communicate with compressed air conduits or attachments as desired.

BACKGROUND OF THE INVENTION

Many workshop environments utilize compressed air sources. Such work shop environments which utilize compressed air sources include automotive repair shops, machine shops, and the like. The compressed air is utilized for air tools, sprayers, coolant misters, pneumatics on production lines.

The pressurized air sources as utilized by the prior art are predetermined and usually permanently mounted for each particular application.

However, additional air source outlets may be required due to the addition of an extra employee or the need for new or other air propelled equipment. Since such prior art includes permanently mounted conduits and connections, the need for additional air source outlets necessitates shutting down the air compressor and cutting or modifying the existing air line plumbing and rethreading and bending tubes. Such operation results in downtime with a loss of productivity. Furthermore, the constructing operation requires the use of sealing the joints plus purchasing of the steel tubing or plastic tubing and the like.

Various attempts have been made in the prior art to utilize connecting or junction boxes.

For example, U.S. Pat. No. 2,688,417 discloses and outlet box having a plurality of inlets which however are utilized for electric wiring.

Moreover, U.S. Pat. No. 2,751,757 relates to a liquid dispenser for refrigerators and particularly discloses a liquid conduit and dispensing valve.

Yet another arrangement is shown in U.S. Pat. No. 2,939,519 which relates to conduits concerning a radiator and particularly discloses means of pipes entering a manifold.

A further arrangement is disclosed in U.S. Pat. No. 3,842,870 which relates to a quick disconnect manifold assembly for a water conditioning or treatment service unit which can be readily adapted for normal treatment flow operation to allow quick and easy removal and replenishment of water conditioning ingredients from the unit.

It is an object of this invention to provide a more efficient compressed air manifold for compressed junction box which may be easily mounted and utilized to connect and communicate with a plurality of air compressed tools as the need arises.

SUMMARY OF THE INVENTION

The broadest aspect of this invention relates to an air manifold having a plurality of apertures communicating with each other interiorally of the air manifold, wherein one of the apertures is adapted to communicate with a compressed air source and the other apertures are adapted to selectively receive a closure for maintaining the air source interiorally of the manifold, or air conduits for communicating with the compressed air source.

It is another aspect of this invention to provide a junction box for compressed air including: a plastic manifold; a first air passage through the plastic manifold presenting an inlet and an outlet; the inlet presenting interior threads for threaded engagement and communication with a threaded compressed air conduit; the outlet presenting interior threads for selective threaded engagement with, and communication with a threaded compressed air conduit, or a plug; a plurality of passages communicating with said first air passage at one end and presenting an aperture to said manifold at said other end; the plurality of passages including interior threads adjacent the plurality of apertures respectively for selected threaded engagement with, and communication with a threaded compressed air conduit, or a plug.

DRAWINGS OF THE INVENTION

These and other objects and features are illustrated and described in the following specification to be read in conjunction with the sheets of drawings in which:

FIG. 1 is a prospective view of the compressed air junction box.

FIG. 2 is a section view of the compressed air junction box along the line 2—2 of FIG. 1.

FIG. 3 is a perspective view of the compressed air junction box showing the different accessories that may be selectively connected thereto.

DESCRIPTION OF THE INVENTION

In the figures like numerals represent like elements.

FIG. 1 generally illustrates the air manifold or compressed air junction box 2 which has a flat rear surface 4, a flat front surface 6 which is spaced from said rear surface, and a top and bottom surface 8 and 10 respectively. The air manifold 2 also includes angled surfaces 12 and 14 respectively as well as opposite side walls 16 and 18 respectively. These surfaces define a housing.

The air manifold or compressed air junction box 2 in the preferred embodiment is comprised of light weight high density plastic although other materials may be effectively utilized in accordance with the invention to be described herein.

The air manifold 2 includes a chamber or first passage 20 which extends between side surfaces 16 and 18 so as to present an aperture or inlet 22 and an aperture or outlet 24. The inlet 22 includes interior thread means 26 which are adapted to threadably engage with a compressed air source (not shown) by means of a compressed air conduit 28 having an exterior thread 30 at one end thereof for engagement with the interior threads 22 of inlet 26. Moreover, the interior threads 26 are tapered inwardly so as to obviate the need for sealing tape or the like. Furthermore, as the compressed air conduit 28 is progressively threadably secured into the inlet 22, the tapered threads 26 ensure an operable fit.

The other end of the passage 20 includes an outlet 24 which also presents an interior thread 28 which is tapered interiorally of the manifold 2. The outlet 24 is adapted to selectively receive either a plug 30 so as to maintain the compressed air pressure within the air manifold 2 or alternatively to threadably engagably receive a flexible air conduit or other compressed air accessories 32 as generally shown in FIG. 3. Such other accessories could include pipes, pressure gauges, valves or the like.

The compressed air box 2 also includes a plurality of apertures 34 which are presented at that exterior surface of compressed or junction box 2. In the preferred embodiment disclosed, the apertures 34 are presented on angled surfaces 12 and 14.

The plurality of apertures 34 communicate with a plurality of passages 36 respectively which communicate with the first air passage 20 as best illustrated in FIG. 2. The plurality of passages 36 are generally disposed parallel relative one another and intersect with the first air passage 20 at a perpendicular angle.

In the embodiment disclosed in the drawings the compressed air junction box is constructed from light weight high density plastic by shaping a block of plastic material and then drilling the appropriate passageways. Thereafter, the interior threads 26 and 28 may be applied by conventional tapping means. Alternatively the manifold could be injected moulded. Furthermore, the plurality of passages 36 include interior threads 38 in the region adjacent the apertures 34 for selective engagement with either a plug 30 so as to maintain the air pressure within the air manifold 2 or alternatively with any number of air attachments or tools 32, as required.

The air manifold 2 includes a fastening means such as the provision of holes 40 which are adapted to receive bolts for securement to a wall 42 or alternatively, the back 4 of air manifold 2 includes a magnetic material 44 which is secured thereto and then adapted to be releasable secured to a metallic surface 42 as shown in FIG. 2. The magnetic material 44 as shown in the drawings may be coextensive with the width of the manifold 2 or alternatively may be slightly less in width (or length) than the width (or length) of the manifold 2 so as to accommodate the insertion of a screwdriver to permit prying the manifold 2 from the metallic surface.

Accordingly, the compressed air junction box 2 utilized herein may be permanently secured to a wall 42 of a workshop. Such securement may be by connecting the air manifold 2 to a compressed air inlet conduit 28 and then apply plugs 30 to the outlet 24 and the plurality of apertures 40. Alternatively, the air manifold 2 may be connected to an inlet conduit 28 and an outlet conduit (not shown) which continues to another source; while all of the other plurality of apertures 40 may include plugs. Then as the need arises, the plugs 30 may be removed from the air manifold 2 and the appropriate air conduit applied thereto or compressed air tool connected, as required. Such connection and disconnection could be applied quickly and easily with very little downtime. Alternatively, one of the apertures 40 could permanently include an air valve which would be normally closed and activated to receive an air tool 32 when required, so as to obviate the need to shut down the air compressor (not shown).

The inlet 26 and outlet 24 also define apertures.

The thickness of the compressed air junction box 2 would be such so as to withstand normal compressed air pressures of up to 200 p.s.i.

Although the preferred embodiment as well as the operation and use of this invention has been specifically described in relation to the drawings, it should be understood that variations in the preferred embodiment could be easily achieved by a skilled in the trade without departing from the spirit of the invention. Accordingly, the invention should not be understood as being limited to the exact form revealed in the drawings.

The embodiments of the invention in which an exclusive property or privilege is claimed or defined as follows:

1. In a junction box for compressed air including:
   (a) a plastic manifold defined by a flat rear surface adapted for releasable securement to a wall, a flat front surface spaced from said rear surface, spaced opposite side walls connecting said rear and front surfaces, a top and bottom surface extending from said rear surface toward said front surface, and a pair of angled surfaces joining said front surface to said top and bottom surfaces respectively;
   (b) a first compressed air passage through said plastic manifold between and terminating at said side walls presenting an inlet and an outlet;
   (c) said inlet presenting interior threads for threaded engagement and communication with a threaded compressed air conduit;
   (d) said outlet presenting interior threads for selected threaded engagement with:
      (i) and communication with a threaded compressed air conduit; or
      (ii) a plug;
   (e) a plurality of passages extending from and communicating with said first air passage at one end thereof to said front surface and said angled surfaces and presenting an aperture into said manifold at said front surface and said angled surfaces;
   (f) said plurality of passages including interior threads adjacent said plurality of apertures respectively for selected threaded engagement with:
      (i) and communicating with a threaded compressed conduit; or
      (ii) a plug.

2. In a compressed air junction box as claimed in claim 1 wherein said manifold includes magnetic material adjacent said rear surface for releasable securement to a metallic surface.

3. In a compressed air junction box as claimed in claim 2 wherein said plurality of passages are parallel relative one another and intersects the first passage at 90°.

4. In a compressed air junction box as claimed in claim 3 wherein said manifold comprises of light weight high density plastic.

5. In a compressed air junction box as claimed in claim 4 wherein said threads are tapered interiorally of said manifold to obviate the need for sealing tape.

6. In a compressed air junction box as claimed in claim 5 wherein said compressed air junction box has a thickness to withstand compressed air pressures of up to 200 psi.

7. In a compressed air junction box as claimed in claim 5 wherein said manifold includes means to releasably fasten said manifold to a wall, and said releasable fastening means comprise holes.

8. In a compressed air junction box as claimed in claim 7 wherein said plug and said compressed conduits are threadedly engageable with said plurality of passages in a direction away from said rear surface and said wall.

* * * * *